United States Patent
Kass

[11] 3,713,538
[45] Jan. 30, 1973

[54] CYCLE VALVE FOR FILTERS
[72] Inventor: Charles L. Kass, 22 Bloomingdale Dr., Scarsdale, N.Y. 10583
[22] Filed: Nov. 30, 1970
[21] Appl. No.: 93,589

Related U.S. Application Data
[63] Continuation-in-part of Ser. No. 724,079, April 25, 1968, Pat. No. 3,547,270.

[52] U.S. Cl. ............210/138, 210/264, 210/277, 210/333
[51] Int. Cl. ..................B01d 35/12, B01d 23/24
[58] Field of Search ......137/545; 210/264, 277, 333, 210/138, 142, 284, 340, 341

[56] References Cited

UNITED STATES PATENTS

| | | | |
|---|---|---|---|
| 3,380,591 | 4/1968 | Muller | 210/333 X |
| 769,143 | 9/1904 | Boellinghaus | 210/284 X |
| 3,578,167 | 5/1971 | Clack et al. | 210/253 X |
| 3,547,270 | 12/1970 | Kass | 210/264 |

*Primary Examiner*—Frank A. Spear, Jr.
*Attorney*—Friedman & Goodman

[57] ABSTRACT

A cycle valve having an inlet chamber and an outlet chamber for passing untreated liquid to and collecting filtered liquid from a plurality of filtering tanks, respectively. The cycle valve permits a selected one of the filtering tanks to be backwashed while the remaining filtering tanks continue to operate. The cycle valve is provided with cooperating valve members, one valve member being disposed in the inlet chamber and the other valve member being disposed in the outlet chamber, with the valve members being secured to opposite ends of a connecting rod. Rotation of the connecting rod effectively rotates the cooperating valve members to an operative position to backwash the selected filtering tank while the remaining filtering tanks perform their filtration operations. The cycle valve is provided with a timing device to control the length of time the selected filtering tank is backwashed, a selection device to predetermine which filtering tanks are to be back-washed, and a device to rotate the connecting rod and thus move the valve members from one operative position to another operative position.

12 Claims, 7 Drawing Figures

INVENTOR.
CHARLES L. KASS

CHARLES L. KASS
INVENTOR.

CHARLES L. KASS
INVENTOR.

3,713,538

CYCLE VALVE FOR FILTERS

CROSS-REFERENCE TO RELATED APPLICATION

This application is a continuation-in-part of application Ser. No. 724,079, filed Apr. 25, 1968, now U.S. Pat. No. 3,547,270.

BACKGROUND OF THE INVENTION

Filter apparatus for filtering liquids are well known in the art. An untreated liquid is passed by means of gravity through a filtering tank containing a filter media such as sand, and then the filtered or treated liquid is collected at the bottom of the tank. The filtered liquid is then pumped from the bottom of the tank to a desired location. The filter media eventually becomes clogged with trapped particles released from the untreated liquid. The filtering operation must be halted at this point to clean the filter media, where the filter media is usually cleaned by backwashing the filtering tank, wherein the direction of the flow of liquid through the filtering tank is reversed. tank is reversed.

When only one filtering tank is in operation, the discontinuation of the filtering operation for backwashing is, of course, most inefficient in private and industrial use, as well as being particularly uneconomical in industrial use. While multiple filtering tanks in one assembly have been attempted, where an individual filtering tank may be backwashed, these assemblies suffer from the disadvantage that an individual siphon and pump must be provided for each filtering tank together with assiciated elements which results in a rather complicated apparatus.

There are filtering tanks which operate continuously with no stoppage due to backwashing, such as self-cleaning compartmentalized filtering tanks, where each compartment of the filtering tank may be individually backwashed while the remaining compartments of the filtering tank continue their filtering operations. These compartmentalized filtering tanks are limited as to the size they may be made, and also are rather expensive when compared to the conventional filtering tank. Furthermore, these compartmentalized filtering tanks are usually installed having only one particular capacity for handling untreated liquid, wherein no adjustment can be made for handling more or less untreated liquid.

SUMMARY OF THE INVENTION

The present invention relates to a valve, and more particularly to a cycle valve for a plurality of filtering tanks. The cycle valve includes cooperating valve means to allow a selected one of the filtering tanks to be backwashed while the remaining filtering tanks continue to perform their filtration operations. The cycle valve is provided with timing means to control the length of time the selected filtering tank is backwashed, selection means to predetermine which filtering tanks are to be backwashed, and means to rotate the valve means from one operative backwashing position associated with one of the selected filtering tanks to another operative backwashing position associated with another of the selected filtering tanks.

Accordingly, an object of the invention is to provide an improved filter apparatus for filtering liquids which overcomes the disadvantages of the prior art.

Another object of the invention is to provide a valve device that can be easily disposed in association with a plurality of filtering tanks so that a selected one of the filtering tanks can be backwashed while the remaining filtering tanks continue to perform their filtration operations.

A further object of this invention is to provide a valve device that can be readily produced and maintained with relatively little expense, which nevertheless is highly efficient in operation and has a relatively long trouble-free life.

A still further object of this invention is to provide a valve device which prevents any possibility of unfiltered liquid coming in contact with filtered liquid.

Yet another object of this invention is to provide a filter apparatus which does not require any external source for backwashing fluid, wherein the backwashing fluid is drawn from the other filtering tanks.

And yet another object of this invention is to provide a filter apparatus which includes a timing device to control the length of time each filtering tank is backwashed.

And still yet another object of this invention is to provide a filter apparatus which includes a selection device to predetermine which filtering tanks are to be backwashed.

And still yet an additional object of this invention is to provide means to rotate the valve device from one operative backwashing position associated with one of the filtering tanks to another operative backwashing position associated with another of the filtering tanks.

BRIEF DESCRIPTION OF THE DRAWINGS

Having in mind the above and other objects that will be evident from an understanding of this disclosure, the invention comprises the device, combinations and arrangements of parts as illustrated in the presently preferred embodiment of the invention which is hereinafter set forth in such detail as to enable those skilled in the art readily to understand the function, operation, construction and advantages of it, when read in conjunction with the accompanying drawings in which.

DESCRIPTION OF THE PREFERRED EMBODIMENTS

Figure 1:
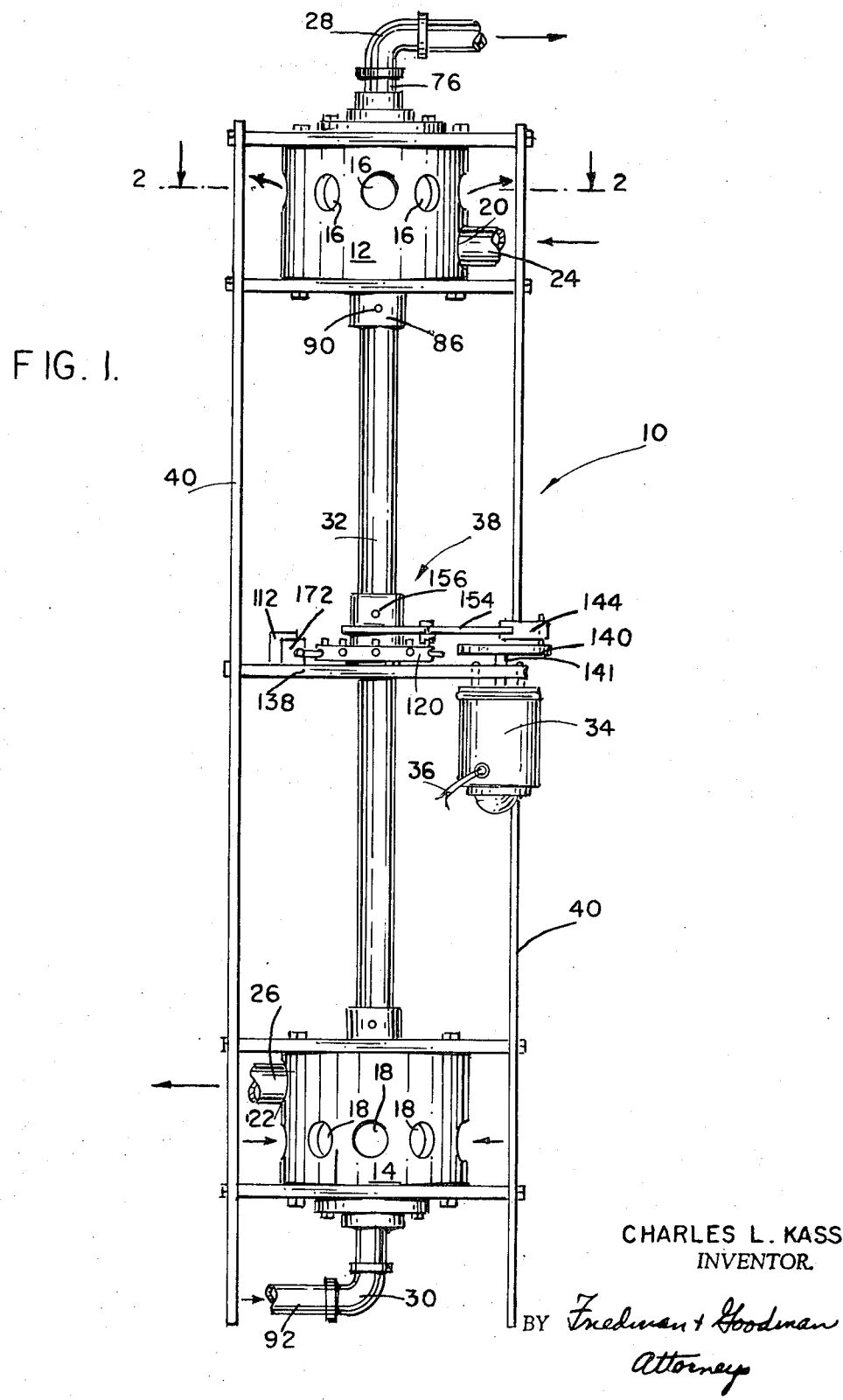
FIG. 1 represents an elevational view of a cycle valve for a plurality of filtering tanks pursuant to the invention.

Referring to the drawings, FIG. 1 illustrates a cycle valve 10 including an upper chamber member 12 and a lower chamber member 14 provided with equally spaced circumferential apertures 16 and 18 respectively on the sidewalls thereof. Chamber member 12 is also provided with an inlet aperture 20 on its sidewall to receive a conduit or a pipe 24. Chamber member 14 is similarly provided with an outlet aperture 22 on its sidewall to receive a conduit or pipe 26. A valve member 28 is disposed in chamber member 12 and a similar valve member 30 is disposed in chamber member 14, the function of each will be discussed hereinafter below.

The valve members 28, 30 are secured to opposite ends of a connecting rod or shaft 32. A conventional gear reduction motor 34, provided with a power cord 36 for connection to a conventional power source, is used to rotate the connecting rod 32 and the valve members 28, 30 connected thereto. An indexing mechanism 38 controls the motor 34 and therefore the rotation of the connecting rod 32. The structure and function of the indexing mechanism 38 will be set forth in greater detail hereinafter below. Support members 40 secure the upper and lower chamber members 12, 14 in place relative to each other and also serve to mount the motor 34 and the indexing mechanism 38.

Figure 2:
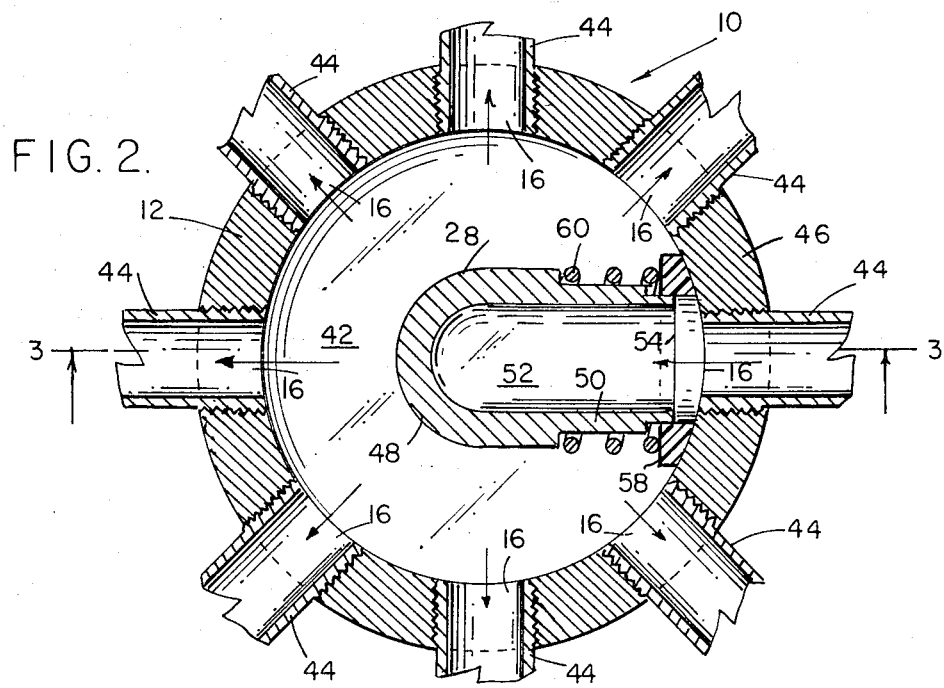
FIG. 2 represents a sectional view, taken substantially on the line 2—2 of FIG. 1, showing an upper valve member of this invention.
Figure 3:
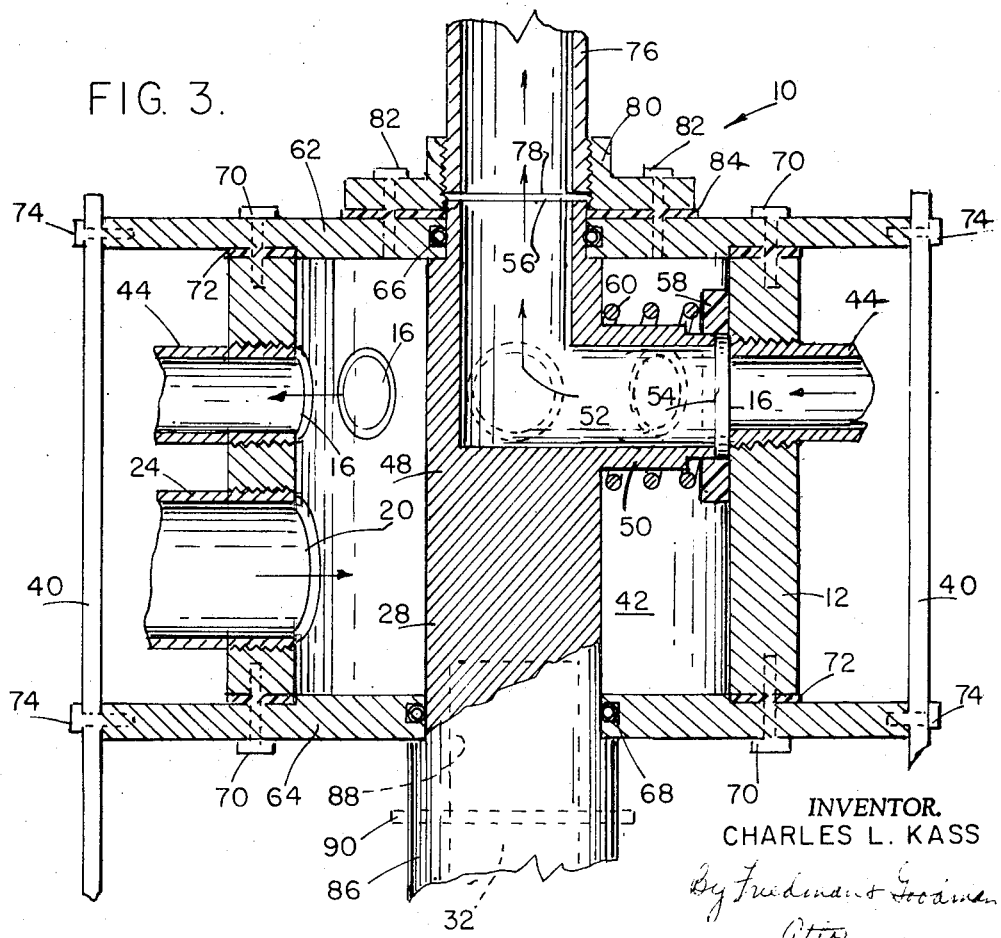
FIG. 3 represents a sectional view taken substantially on the line 3—3 of FIG. 2.

Inasmuch as the upper chamber member 12 is similar to the lower chamber member 14 and the valve member 28 is similar to the valve member 30, it is only necessary to set forth the detailed structure of one of each of these similar members. Accordingly, FIGS. 2 and 3 illustrate the upper chamber member 12 and valve member 28. The chamber member 12 defines a chamber 42 in communication with the apertures 16 and 20. Each of the apertures 16 receives a conduit or pipe 44 which is preferably threadedly engaged therein. Each pipe 44 is connected to one of a plurality of filtering tanks (not shown). In the embodiment shown in FIG. 2, there would be eight individual filtering tanks, however, this number may be increased or lowered depending upon the need of the user. Each of the equally spaced pipes 44 extend horizontally outward from sidewall 46 of the chamber member 12. The inlet pipe 24, which is also preferably threadedly engaged in aperture 20, also extends horizontally outwardly from sidewall 46.

The valve member 28 is centrally disposed within the chamber 42 for rotation therein, wherein the sidewalls 46 define a hollow cylinder. The vertically disposed portion 48 of the valve member 28 is provided with a horizontally extending portion 50. A right angled passageway 52 is formed in the valve member 28, extending from the free end of the horizontal portion 50 to the upper portion of the vertical portion 48, having openings 54 and 56 at each end thereof respectively. The opening 54 is in horizontal alignment with the openings 16, wherein the axes of the openings 16 and the opening 54 are disposed in the same horizontal plane.

The free end of the horizontal portion 50 is slightly spaced from the sidewall 46 to permit easy rotation of the valve member 28. A conventional seal 58 is disposed on the end of horizontal portion 50 between the horizontal portion 50 and the sidewall 46 to close the space therebetween. A spring 60 disposed on the horizontal portion 50, exerts pressure against the seal 58 to prevent any leakage of the liquid around the seal 58.

The chamber member 12 includes an upper cover plate 62 and a lower cover plate 64, each plate provided with a centrally located opening to rotatably receive the valve member 28, with the openings being in axial alignment, and each opening being provided with a conventional O-ring seal 66 and 68 respectively, to prevent leakage from the chamber 42. The cover plates 62, 64 are secured to the sidewall 46 by conventional means, such as fasteners 70. Annular gaskets 72 are disposed between the cover plates 62, 64 and the sidewall 46 to prevent leakage from the chamber 42. The cover plates 62, 64 are secured to the support members 40 by conventional means such as fasteners 74, to hold the chamber member 12 stationary relative to the filtering tanks.

The valve member 28 includes an upper conduit or pipe 76 provided with an opening 78 disposed adjacent opening 56 of the vertical portion 48. The conduit 76 is preferably threadedly engaged in a flange 80 which is conventionally secured such as by fasteners 82 to the upper surface of cover plate 62 to hold the conduit 76 stationary with respect to the chamber member 12 while the vertical portion 48 of valve member 28 is free to rotate. Preferably, an annular gasket 84 is disposed between the flange 80 and the cover plate 62 to prevent leakage.

The lower portion 86 of the vertical portion 48 is provided with an opening 88 to receive the upper portion of the shaft 32. A pin 90 passes through the lower portion 86 and the shaft 32 to secure the vertical portion 48 to the shaft 32 for rotation therewith.

In operation, the opening 54 of the valve member 28 is disposed in communication with a selected one of the apertures 16 with a similar opening in the valve member 30 being disposed in communication with an associated selected opening 18 in the lower chamber member 14. The selected pair of apertures 16, 18 is operatively connected to the same filter tank that is to be backwashed, wherein each filter tank is in communication with a pair of associated openings 16, 18 in a fixed relationship thereto.

The unfiltered liquid passes from conduit 24 through the opening 20 into the chamber 42 of the upper chamber 12. The unfiltered liquid then passes out through the openings 16 (except the selected opening 16 which is enclosed by the valve member 28) into the conduits 44 to be carried to the filtering tanks. After the filtration operation, the filtered liquid is carried from the filter tanks by means of conduits to the associated openings 18 of the lower chamber member 14 so that the filtered liquid is collected in the lower chamber member 14. The filtered liquid then passes through the outlet opening 22 and is carried by the conduit 26 to a desired location for use thereof.

During the above operation, a liquid, preferably filtered, is passed through the conduit 92, shown in FIG. 1, and into the valve member 30. The liquid then passes through the selected opening 18 of the lower chamber member 14 and carried by conduit means to the selected filter tank to be backwashed. After the backwashing operation, the backwash liquid containing contaminants and sludge is then carried from the filter tank by conduit 44 to the selected opening 16 of the upper chamber member 12 and into opening 54 of passageway 52 The backwash liquid then flows through the passageway 52 and out the opening 56 into the opening 78 of the stationary conduit 76. The conduit 76 carries the backwash liquid to a desired location (not shown) for disposal thereof.

Figure 4:
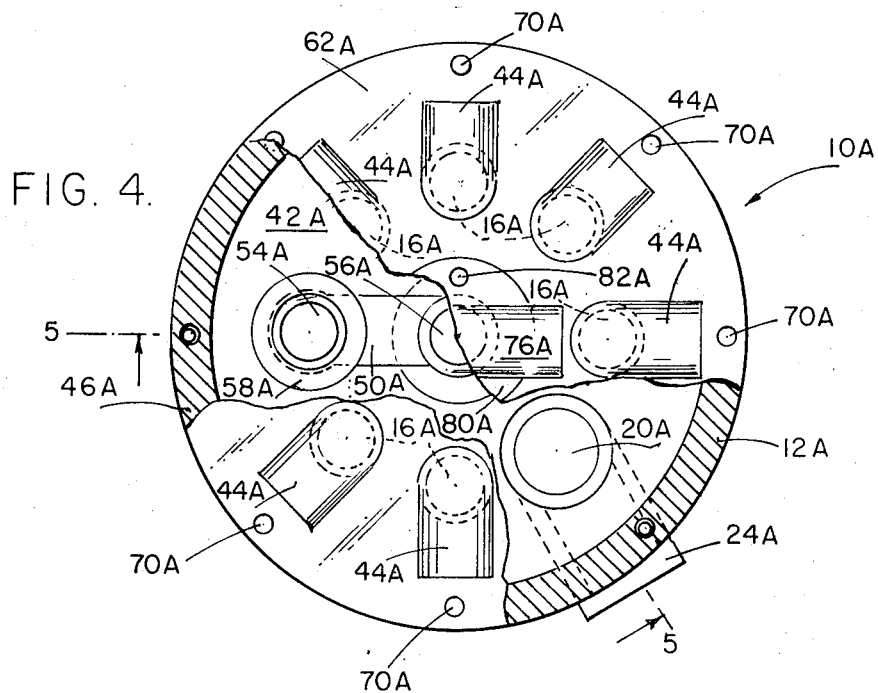
FIG. 4 represents a fragmentary top plan view, in section, of a second embodiment of the present invention, showing an upper valve member similar to that shown in FIG. 3.
Figure 5:
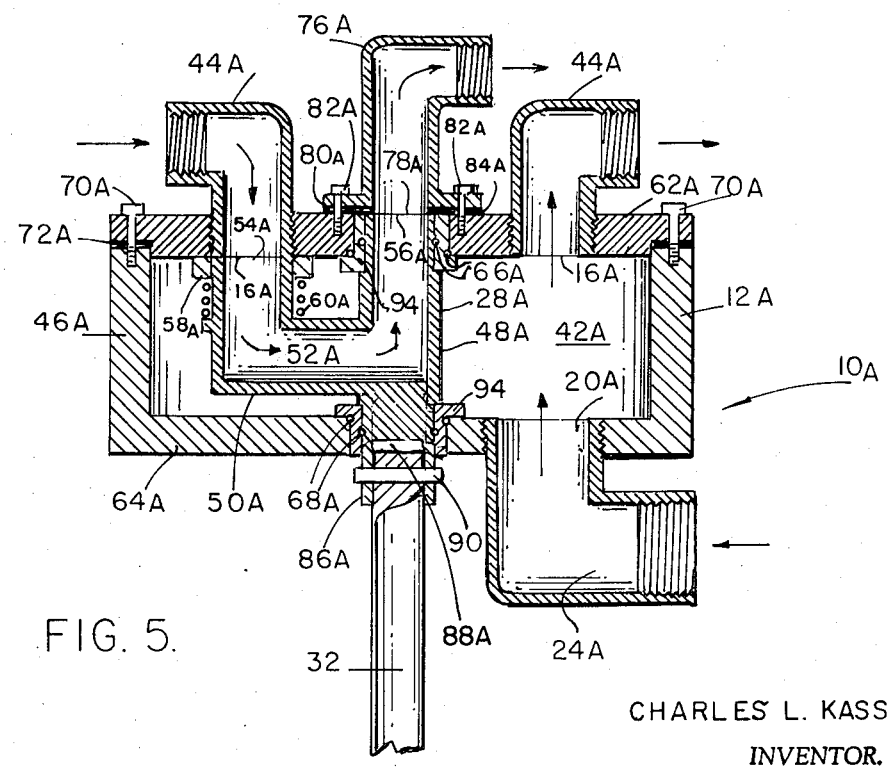
FIG. 5 represents a sectional view taken substantially on the line 5—5 of FIG. 4.

FIGS. 4 and 5 illustrate a second embodiment of a cycle valve of the present invention, wherein similar parts are denoted by similar reference numerals.

In this construction, the cycle valve 10A includes a chamber member 12A and a valve member 28A. It is understood that the chamber member 12A may be used as either an upper chamber member or a lower chamber member, wherein the cycle valve 10A may have an upper and lower chamber member similar to chamber member 12A, or one of the chamber members may be similar to chamber member 12A with the other chamber member at the opposite end of connecting rod 32 being similar to the chamber member 12 shown in FIGS. 1-3, where either combination would work equally as well.

The chamber member 12A, illustrated in FIGS. 4 and 5 as an upper chamber member, includes sidewall 46A integrally connected to a lower cover plate 64A to form one unit and an upper cover plate 62A secured to the sidewall 46A by conventional means, such as fasteners 70A. An annular gasket 72A is disposed between the upper cover plate 62A and the sidewall 46A to prevent leakage from the chamber member 12A. The cover plate 62A is provided with equally spaced, circularly disposed apertures 16A having the same radial distance from the center thereof.

The lower cover plate 64A is provided with an inlet aperture 20A to receive a 90° elbow conduit or pipe 24A, preferably threaded therein. Each of the apertures 16A also receives a 90° elbow conduit or pipe 44A, also preferably threaded therein, which is connected to one of a plurality of filtering tanks (not shown). Each of the pipes 44A extends vertically outwardly from the cover plate 62A with the opposite end extending radially outwardly in a spoke-like manner. The inlet pipe 24A extends vertically outwardly from the lower cover plate 64A. Here again, there would be eight individual filtering tanks in use with the cycle valve 10A, however, as stated before, this number may be increased or lowered depending upon the need of the user, wherein the invention is not intended to be limited to any specific number.

The chamber member 12A defines a chamber 42A in communication with the apertures 16A and 20A. The valve member 28A is centrally disposed within the chamber 42A for rotation therein. As shown, the sidewalls 46A define a hollow cylinder, however, in this embodiment the sidewalls need not be cylindrical and can take any desired shape, such as rectangular.

The valve member 28A includes a vertically dispose portion 48A provided with a horizontally extending 90° elbow portion 50A. A U-shaped passageway 52A is formed in the valve member 28A extending from the free end of the elbow portion 50A to the upper portion of the vertical portion 48A with openings 54A and 65A at each end thereof respectively. The opening 554A is in vertical alignment with the openings 16A, with each having the same radial spacing.

The free end of the elbow portion 50A is adjacent the lower surface of the upper plate 62A, being disposed with enough clearance to permit rotation of the valve member 28A. A conventional seal 58A is disposed on the valve member 28A between the elbow portion 50A and the upper cover plate 62A to close the space therebetween. A spring 60A disposed on the elbow portion 50A exerts pressure against the seal 58A to prevent any leakage of the liquid around the seal 58A.

The upper and lower cover plates 62A, 64A are each provided with a centrally located opening to receive a conventional bushing 94, with each bushing 94 being provided with a pair of conventional O-ring seals 66A and 68A respectively to prevent leakage from the chamber 42A. The blushings 94 are in axial alignment to rotatably receive the valve member 28A.

The valve member 28A includes an upper elbow conduit or pipe 76A provided with an opening 78A disposed adjacent to opening 56A of the vertical portion 48A. The conduit 76A is preferably provided with a flange portion 80A which is conventionally secured such as by fasteners 82A to the upper surface of the cover plate 62A to hold the conduit 76A stationary with respect to the chamber member 12A while vertical portion 48A is free to rotate. Preferably, an annual gasket 84A is disposed between the flange 80A and the cover plate 62A to prevent leakage.

The lower portion 86A of the vertical portion 48A is provided with an opening 88A to receive the upper portion of the shaft 32. The pin 90 passes through the lower portion 86A and the shaft 32 to secure the vertical portion 48A to the shaft 32 for rotation therewith.

The operation of the cycle valve 10A of FIGS. 4 and 5 is the same as the operation of the cycle valve 10 of FIGS. 1-3, differing only in the location of the apertures 16A and 20A, wherein the above discussed operation is applicable to both embodiments of the cycle valve. Both embodiments of the cycle valve prevent any possibility of unfiltered liquid coming in contact with filtered liquid in any phase, including filtering or backwashing. As set forth above and disclosed in the drawings, the backwash liquid exists through the upper chamber member and the unfiltered fluid enters through the same upper chamber member, while the filtered fluid exits through the lower chamber member and the filtered fluid for the backwash operation enters through the same lower chamber member, so that the contaminated liquid cannot possibly mix with the filtered liquid. This feature has not been disclosed in any other system known in the art. Furthermore, the present cycle valve does not require any external source for the liquid used in the backwash operation, wherein other systems known in the art must use a storage tank or a complete new source of backwash fluid. The present cycle valve preferably draws its fluid for backwashing from the other filter tanks that are passing filtered liquid into the lower chamber member of the cycle valve, wherein a portion of this filtered liquid is preferably directed from the outlet conduit 26 into the conduit 92 to be used for backwashing.

Figure 6:
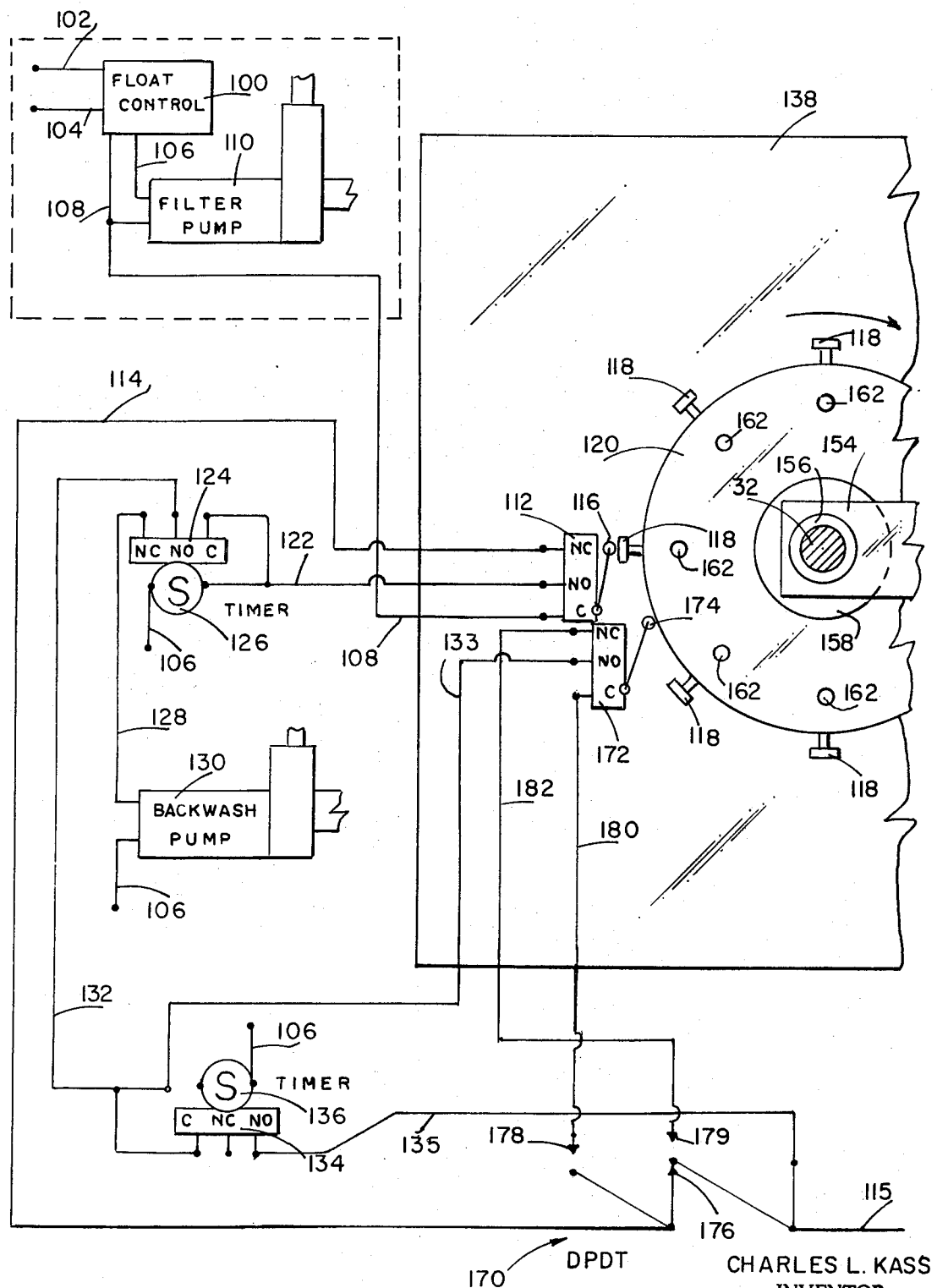
FIGS. 6 and 7 represent schematic diagrams showing the parts and circuitry involved in the operation of the cycle valve of the present invention.
Figure 7:
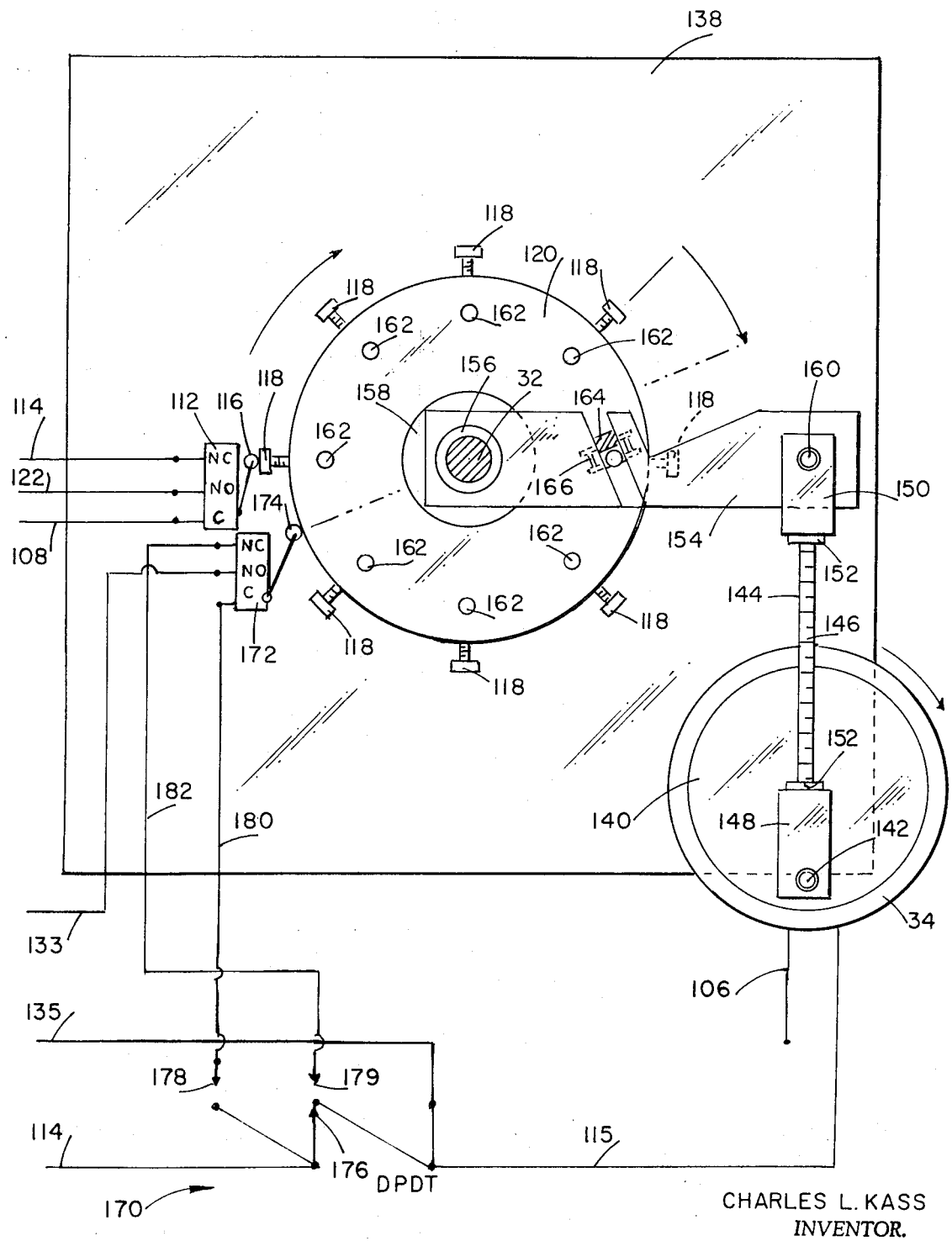

FIGS. 6 and 7 illustrate schematic diagrams showing the indexing mechanism 38 and circuitry involved for the rotation of the connecting rod 32, which may be used with either of the above-mentioned embodiments of the cycle valve for continuous filtration and backwash without stopping the operation thereof.

A float control control 100 senses when there is enough unfiltered liquid for the filtration process to begin. The float control 100 is connected to a power source (not shown) by lines 102 aNd 104. When there is enough unfiltered fluid, the float control 100 provides power through lines 106 and 108 to a filter pump 110 and to a microswitch 112. The filter pump 110 supplies the unfiltered liquid to the cycle valve. The microswitch 112 in the normally closed position (NC) provides power through lines 114 and 115 to the motor 34 which rotates the connecting rod 32, the lines 114, 115 being preferably connected by a switch 170 whose function will be discussed hereinafter below. As shown in FIG. 7, line 106 is also connected to the motor 34 to complete the circuit.

At the starting of a complete cycle, the contact 116 of microswitch 112 engages one of the index screws 118 on the rotatable index plate 120 to close the normally open circuit (NO) of microswitch 112. The index plate 120 is secured by conventional means to the connecting rod 32 for rotation therewith. The closed normally opened circuit (NO) of microswitch 112 energizes through line 122 a microswitch 124 which is controlled by a timer 126, the timer 126 being connected to line 106 to complete the circuit. The normally closed circuit (NC) of the microswitch 124 energizes through line 128 a backwash pump 130, the pump 130 also being connected to line 106 for a complete circuit.

The backwash pump 130 operates for a predetermined time which is required to complete the backwashing operation. At the end of this predetermined time, the normally closed circuit (NC) opens and the normally opened circuit (NO) of microswitch 124 closes. The normally opened circuit (NO) of microswitch 124 energizes through line 132 a microswitch 134 controlled by a timer 136, the timer 136 being connected to line 106 to complete the circuit.

The timer 136 maintains the microswitch 134 in the normally closed (NC) position for a predetermined time. This latter predetermined time is determined by the amount of time the filtering tanks can be operated efficiently before requiring backwashing less the above-mentioned predetermined backwashing time. At the end of the second predetermined time, the timer 136 closes the normally open circuit (NO) of the microswitch 134, which is connected to lines 135 and 115, thereby energizing the motor 34 through lines 135, 115 and line 106.

The motor 34 is mounted by conventional means on the underside of a plate 138 which is secured by conventional means to the support members 40. The plate 138 is provided with a centrally located opening to rotatably receive the connecting rod 32. A cam 140 disposed above the plate 138 is secured to a driving pin 141 of the motor 34, as shown in FIG. 1, the driving pin 141 extending through an opening (not shown) provided in the plate 138. The driving pin 141 rotates the cam 140 in a clockwise direction as shown in FIG. 7. The cam 140 is provided with an eccentrically located pin 142 disposed on the upper surface thereof.

An adjustable shaft 144 is rotatably on the eccentrically mounted pin 142 of the cam 140. The shaft 140 includes a threaded member 146 provided with an adjusting block 148 at one end thereof and a yolk 150 at the other end thereof. Conventional locknuts 152 are disposed on the threaded member 146 adjacent the block 148 and the yolk 150 so that the length of the shaft 144 can be easily adjusted. The block 148 is provided with an opening to rotatably receive the pin 142 of the cam 140.

A ratchet arm 154 is provided with a bushing 156 at one end thereof for rotatable mounting the ratchet arm 154 on the connecting rod 32. The bushing 156 is secured by conventional means to the rod 32 so that the ratchet arm is free to rotate about the bushing 156 and the connecting rod 32 which joins the upper and lower chamber members. A spacer 158 is provided between the ratchet arm 154 and the index plate 120 so that these members can be easily rotated relative to each other, preferably the spacer is made of Teflon to reduce the friction therebetween. A pin 160 is disposed at the other end of the ratchet arm 154 on an upper surface thereof for rotatable engagement in an aperture provided in the yolk 150 of the shaft 144. Rotation of the cam 140 causes the shaft 144 to move the ratchet arm 154 back and forth in a predetermined arc.

The upper surface of the index plate 120 is provided with a plurality of equally spaced, circularly disposed, upwardly extending index pins 162. There are as many index pins 162 as there are index screws 118. The index screws 118 are also equally spaced on the peripheral edge of the index plate 120. Each index screw 118 is associated with a filter tank, therefore, there are eight index screws 188 for the eight filter tanks set forth above.

The angle between each index screw 118, and therefore between each index pin 162, is predetermined at 45°. The number of degrees required would change if more filtering tanks are desired to be used. For example: if 10 filtering tanks were used, there would be required 10 index screws and 10 index pins with a predetermined spacing of 36°. The situation where less than light filtering tanks are used will be set forth hereinafterbelow.

The ratchet arm 154 is provided with a ratchet pawl 164 for engaging one of the index pins 162, and pull-springs 166 for return of ratchet pawl 164. On the first half revolution of the cam 140, the pull-springs 166 allow the ratchet pull 164 to disengage from an engaged index pin 162 and move in a 45° arc in a counterclockwise direction as shown in FIG. 7, to engage the next index pin 162 on the index plate 120. On the second half revolution of the cam 140, the ratchet arm 154 moves in a 45° arc, in a clockwise direction, moving the engaged index pin 162 together with the index plate 120 through the latter 45°. The index plate 120 causes the connecting rod 32 to also move through the same 45°, thereby rotating the upper and lower valve members through the same 45° into alignment with the next pair of associated openings 16 and 18 of the upper and lower chamber members 12, 14 respectfully.

During the movement of the index plate 120, the index screw 118 is disengaged from the contact 116 of the microswitch 112 so that the normally opened circuit (NO) of microswitch 112 is open, thereby effectively de-energizing the microswitch 134 to shut off power to the motor 34. However the normally closed circuit (NC) of microswitch 112 is now closed to maintain the power to the motor 34 until the contact 116 is again engaged by an index screw 118 when the cam 140 has completed its full revolution. The above-mentioned sequence of backwashing one selected filtering tank with the remaining seven filtering tanks in operation, and then having the backwashed filtering tank remain dormant while the remaining seven filtering tanks continue their filtration operation will again repeat, and will continue repeating in a predetermined order until the user desires to stop the operation. It is noted that if for any reason the system is stopped, the system will again continue when started in whatever cycle the filtration process was in when stopped, having been stopped such as for lack of unfiltered liquid to the filtering tanks which effects the float control 100.

The cycle valve is also provided with a feature which allows the cycle valve to operate without any filtering tank being taken out of service, or completely detached from the valve, or for use with less than eight filtering tanks. This is done by removing the index screw 118 correspondingly associated with the detached or missing filtering tank or that tank desired not to be backwashed. For example: If only six filtering tanks are desired to be backwashed or used, then only six index screws 118 will be disposed on the index plate 120. The motor 34 will continue to rotate the cam 140 until an index screw 118 corresponding with a filtering tank engages the contact 116 of the microswitch 112, wherein there is no need to remove any of the index pins 162. For example, in the case of the six filtering tanks, if two adjacent index screws 118 are removed, then there would be a spacing of 135° between two of the index screws 118, whereby the cam 140 would make three revolutions before the motor is stopped.

As set forth above, the rotation of the upper and lower valve members always maintains one filtering tank in dormant state for a predetermined time after the filtering tank has been backwashed. The present cycle valve provides a feature for all the filtering tanks to be operational after the backwashing. This feature includes a double pole double throw (DPDT) switch 170, as shown in FIGS. 6 and 7. The switch 170 is associated with a microswitch 172 provided with a contact 174 adjacent the index plate 120, and spaced 22 ½° from the contact 116 with respect to the rotating center of the index plate 120.

The switch 170 in normal operation of the cycle valve as set forth hereinabove, is in contact with the point 176 to complete the circuit from the normally closed (NC) position of the microswitch 112 through lines 114 and 115 to the motor 34. When the switch 170 is moved into contact with points 178 and 179, the latter mentioned circuit is extended to pass through the microswitch 172. The circuit now includes the normally closed (NC) position of the microswitch 112, the line 114, the switch 170 at point 178, the line 180 connected to the common (c) position of the microswitch 172, the normally closed (NC) position of the microswitch 172, the line 182 which is connected to the switch 170 at point 179, and the line 115 to the motor 34.

Accordingly, when the index screw 118 is now disengaged from the contact 116 of the microswitch 112 during movement of the index plate 120, the normally closed (NC) circuit of microswitch 112 is again closed to maintain the power to the motor 34 by way of the extended circuit which includes microswitch 172 mentioned above. The normally closed (NC) circuit of microswitch 112 will maintain the power to the motor 34 until the index plate 120 rotates 22 ½° to a position wherein the contact 174 of the microswitch 172 is engaged by one of the index screws 118. The contact 174 will open the normally closed (NC) circuit and close the normally open (NO) circuit of the microswitch 172, thereby stopping the motor 34 and movement of the index plate 120.

During this movement, the index plate 120 has caused the connecting rod 32 to also move through the same 22 ½°, thereby rotating the upper and lower valve members through the same 22 ½° into a position midway between adjacent pairs of associated openings 16, 18 of the upper and lower chamber members 12, 14 respectively. In this midway position, the upper and lower valve members are not in communication with any of the filtering tanks, the upper and lower valve members being sealed off from the filtering tanks by the walls of the upper and lower chamber members 12, 14, respectively. Therefore, in this midway position, the chambers of the upper and lower chamber members 12, 14 are in communication with each of the filtering tanks, so that all the filtering tanks are operational and perform their filtration operations.

The normally opened (NO) circuit of the microswitch 172 energizes through line 133 the microswitch 134 which is controlled by the timer 136 mentioned hereinabove. The timer 136 will maintain the microswitch 134 in the normally closed (NC) position for the above-mentioned predetermined time. At the end of this predetermined time, the timer 136 will close the normally opened (NO) circuit of the microswitch 134 which is connected to the lines 135, 115, thereby energizing the motor 34 through lines 135, 115 and line 106, as mentioned above, causing rotation of the cam 140. As mentioned above, the second half revolution of the cam 140 will cause movement of the index plate 120.

During the movement of the index plate 120, the index screw 118 is disengaged from the contact 174 of the microswitch 172 so that the normally opened (NO) circuit of the microswitch 172 is opened to shut off power to the motor 34. However, the normally closed (NC) circuit of the microswitch 172, together with the normally closed (NC) circuit of the microswitch 112 as stated above, will maintain the power to the motor 34 until the contact 116 of microswitch 112 is again engaged by one of the index screws 118 after the index plate 120 has rotated 22 ½°.

The above mentioned sequence will again repeat, and will continue repeating until the user desires to stop the operation, or reposition the switch 170. As noted above, the operation of the cycle valve includes the following steps: (a) backwash one filtering tank with the remaining seven filtering tanks in operation; (b) the backwashed filtering tank in a dormant state with the remaining seven filtering tanks in operation; (c) all eight filtering tanks in operation; and (d) repeating the above steps (a)-(c) until the operation of the cycle valve is stopped.

It is noted, that the latter mentioned sequence may be additionally modified by slight changes in the electrical circuit so that the above-mentioned step (b) is eliminated. However, it is preferably desired to have step (b) to allow the backwashed filtering tank to obtain a normal settled condition after being backwashed and before starting its filtration operation.

The switch 170 may be operated in many ways in addition to being manually controlled. One additional way of operating the switch 170 is by pressure, wherein a build up of resistance to flow within the normally operating filtering tanks at a predetermined pressure will cause the switch 170 to be thrown into contact with points 178 and 179. This throwing of the switch 170 will now place the dormant backwashed filtering tank into the system, as set forth above, to thereby reduce the pressure in the present operating tanks. Another additional way of operating the switch 170 is by a flow meter associated with the filter pump 110 which when a predetermined level of flow of untreated liquid is reached, the switch will be thrown into contact with the above-mentioned points 178 and 179 to thereby place the dormant backwashed filtering tank into the system, as set forth above, to handle the increased amount of flow to the filtering tanks.

Numerous alterations of the structure herein disclosed would suggest themselves to those skilled in the art. However, it is to be understood that the present disclosure relates to preferred embodiments of the invention which are for purposes of illustration only, and are not to be construed as a limitation of the invention.

What is claimed is:

1. A cycle valve for a plurality of filtering tanks, said valve comprising inlet and outlet chamber means each communicable with externally associated filtering tanks for allowing a selected one of the filtering tanks to be backwashed while the remaining filtering tanks continue to perform respective filtration operations, said inlet chamber means passing untreated liquid to the remaining filtering tanks, said outlet chamber means permitting collection of filtered liquid from the remaining filtering tanks, first valve means disposed in said inlet chamber means for receiving backwashed liquid from the selected one of the filtering tanks, second valve means disposed in said outlet chamber means for passing backwashing liquid to the selected one of the filtering tanks, said first and second valve means being communicable with one another through the intermediary of the selected one of the filtering tanks, and drive means associated with said first and second valve means independently of liquid flow for selectively moving both said first and second valve means simultaneously to an operative position to backwash the selected one of the filtering tanks while the remaining filtering tanks perform the respective filtration operations.

2. A cycle valve according to claim 1, wherein said drive means include a connecting rod for rotating said first and second valve means within said inlet and outlet chamber means respectively, said first and second valve means being secured to opposite ends of said connecting rod.

3. A cycle valve according to claim 1, wherein said inlet chamber means is provided with equally spaced apertures, said outlet chamber means being provided with a like number of equally spaced apertures as said inlet chamber means with each outlet chamber means aperture being in fixed relationship with an associated inlet chamber means aperture to define pairs of associated openings, so that each filtering tank is in communication with an associated one of said pairs of associated openings in a fixed relationship thereto.

4. A cycle valve according to claim 3, wherein said drive means position said first and second valve means in communication with a selected one of said pairs of associate openings to permit backwashing of the filtering tank associated with said selected one of said pairs of associated openings.

5. A cycle valve according to claim 4, wherein said apertures of said inlet chamber means are disposed in the sidewalls thereof, said first valve means including a horizontally extending portion provided with an opening at its free end, said drive means positioning said valve means opening adjacent to and in horizontal alignment with a selected one of said sidewalls apertures associated with the selected one of the filtering tanks to permit backwashing thereof.

6. A cycle valve according to claim 4, wherein said apertures of said inlet chamber means are disposed in one of the horizontal walls thereof, said first valve means including a vertically extending portion provided with an opening at its free end, said drive means positioning said valve means opening adjacent to and in vertical alignment with a selected one of said horizontal wall apertures associated with the selected one of the filtering tanks to permit backwashing thereof.

7. A cycle valve as claimed in claim 3, wherein each said first and second valve means includes a spring operated sealing device in operative association with selected of said apertures for preventing leakage.

8. A cycle valve according to claim 1, wherein timing means are associated with said drive means to control the length of time the selected one of the filtering tanks is backwashed.

9. A cycle valve according to claim 1, wherein selection means are associated with said drive means to predetermine which filtering tanks are to be backwashed.

10. A cycle valve according to claim 9, wherein said selection means permit said filtering tanks to be backwashed in a predetermined order.

11. A cycle valve as claimed in claim 10, wherein said selection means include a plurality of detachable pins, and electrical switching means operatively associated with said pins.

12. A cycle valve according to claim 1, wherein alternative means are associated with said drive means to maintain one filtering tank in a dormant state at all times in a first position thereof, and to provide for all the filtering tanks to be operational in a second position thereof.

* * * * *